United States Patent
Ganti et al.

(10) Patent No.: US 8,892,159 B2
(45) Date of Patent: Nov. 18, 2014

(54) MULTI-STANDARD TRANSCEIVER ARCHITECTURE WITH COMMON BALUN AND MIXER

(75) Inventors: Ramkishore Ganti, Bangalore (IN); Sanjeev Ranganathan, Bangalore (IN); Srinath Sridharan, Bangalore (IN)

(73) Assignee: ST-Ericsson SA, Plan-les-Ouates (CH)

( * ) Notice: Subject to any disclaimer, the term of this patent is extended or adjusted under 35 U.S.C. 154(b) by 421 days.

(21) Appl. No.: 13/464,070

(22) Filed: May 4, 2012

(65) Prior Publication Data
US 2013/0116005 A1    May 9, 2013

Related U.S. Application Data

(60) Provisional application No. 61/485,456, filed on May 12, 2011.

(51) Int. Cl.
| | |
|---|---|
| H04W 88/06 | (2009.01) |
| H04B 1/00 | (2006.01) |
| H04B 1/04 | (2006.01) |
| H04B 1/40 | (2006.01) |

(52) U.S. Cl.
CPC ............. *H04W 88/06* (2013.01); *H04B 1/0053* (2013.01); *H04B 1/0483* (2013.01); *H04B 1/406* (2013.01); *H04B 1/0458* (2013.01)
USPC ........................................ 455/552.1; 330/277

(58) Field of Classification Search
CPC .............................. H04W 88/06; H03F 9/1935
USPC ..................................................... 455/552.1
See application file for complete search history.

(56) References Cited

U.S. PATENT DOCUMENTS

| | | | | |
|---|---|---|---|---|
| 5,420,911 | A  * | 5/1995 | Dahlin et al. | 455/553.1 |
| 5,532,708 | A  * | 7/1996 | Krenz et al. | 343/795 |
| 5,903,178 | A  * | 5/1999 | Miyatsuji et al. | 327/308 |
| 6,134,452 | A  * | 10/2000 | Hufford et al. | 455/552.1 |
| 6,714,760 | B2 * | 3/2004 | Robinett | 455/3.02 |
| 6,766,149 | B1 * | 7/2004 | Hikita et al. | 455/83 |
| 6,885,695 | B1 * | 4/2005 | Coniglione | 375/147 |
| 6,952,593 | B2 * | 10/2005 | Pratt | 455/552.1 |

(Continued)

OTHER PUBLICATIONS

Li, Rong Lin; Wu, Terence; Pan, Bo; Lim, Kyuate; Laskar, Joy and Tentzeris, Manos M.; "Equivalent-Circuit Analysis of a Broadband Printed Dipole With Adjusted Integrated Balun and an Array for Base Station Applications", IEEE Transactions on Antennas and Propagation, vol. 57, No. 7, Jul. 2009; pp. 2180-2814; Download on Nov. 29, 2009 from IEEE Xplore.

*Primary Examiner* — Hai V Nguyen
(74) *Attorney, Agent, or Firm* — Coats & Bennett, P.L.L.C.

(57) ABSTRACT

A multi-standard transceiver comprises a common balun, a controller, at least one first switch, and at least one second switch. The common balun comprises a primary coil and a secondary coil. The at least one first switch connects the primary coil of the balun to a first signal path associated with a first communication standard, or to a second signal path associated with a second communication standard responsive to a control signal provided by the controller. The at least one second switch connects the secondary coil of the balun to a first amplification path associated with the first communication standard, or to a second amplification path associated with the second communication standard responsive to a control signal provided by the controller. A common mixer is configured to provide upconverted signals to one of the signal paths depending on which communication standard has been selected.

11 Claims, 6 Drawing Sheets

(56) References Cited

U.S. PATENT DOCUMENTS

| | | | |
|---|---|---|---|
| 7,489,914 B2* | 2/2009 | Govind et al. | 455/168.1 |
| 7,620,399 B2* | 11/2009 | Kim et al. | 455/436 |
| 7,764,125 B2* | 7/2010 | Dawe | 330/305 |
| 7,894,778 B2* | 2/2011 | Li | 455/76 |
| 8,078,123 B2* | 12/2011 | Behzad et al. | 455/114.2 |
| 8,537,855 B2* | 9/2013 | Wieslawa | 370/466 |
| 2002/0177465 A1* | 11/2002 | Robinett | 455/552 |
| 2005/0248418 A1* | 11/2005 | Govind et al. | 331/179 |
| 2006/0068746 A1* | 3/2006 | Feng et al. | 455/323 |
| 2007/0072652 A1* | 3/2007 | Shan et al. | 455/570 |
| 2008/0290947 A1* | 11/2008 | Dawe | 330/282 |
| 2009/0085689 A1* | 4/2009 | Rohani et al. | 333/25 |
| 2009/0124215 A1* | 5/2009 | Nysen | 455/90.1 |
| 2010/0194493 A1 | 8/2010 | Thompson | |
| 2010/0248660 A1* | 9/2010 | Bavisi et al. | 455/120 |
| 2010/0295599 A1 | 11/2010 | Uehara et al. | |
| 2011/0026432 A1* | 2/2011 | Gruber et al. | 370/254 |
| 2011/0026458 A1* | 2/2011 | Gruber et al. | 370/328 |
| 2011/0065400 A1* | 3/2011 | Teikari et al. | 455/129 |
| 2011/0128088 A1 | 6/2011 | Jin et al. | |
| 2011/0143690 A1 | 6/2011 | Jerng et al. | |
| 2012/0032741 A1* | 2/2012 | De Maaijer | 330/277 |
| 2012/0213057 A1* | 8/2012 | Zhang et al. | 370/216 |
| 2013/0135029 A1* | 5/2013 | Xu et al. | 327/355 |
| 2013/0251068 A1* | 9/2013 | Boos et al. | 375/302 |
| 2014/0040450 A1* | 2/2014 | Sanneck et al. | 709/223 |
| 2014/0140455 A1* | 5/2014 | Mirzaei et al. | 375/350 |

* cited by examiner

MULTI-STANDARD TRANSCEIVER ARCHITECTURE WITH COMMON BALUN AND MIXER

RELATED APPLICATION

This application claims the benefit of U.S. Patent Application Ser. No. 61/485,456 filed on May 12, 2011, which is incorporated herein by reference.

FIELD OF INVENTION

The invention described herein relates generally to RF transceivers, and more particularly to transceivers designed to operate in multiple frequency bands according to multiple communication standard requirements.

BACKGROUND

Cellular telephone transmitter subsystems compatible with multiple communication standards, e.g., second generation (2G), second and a half generation (2.5G), and third generation (3G) standards, are available. The 2G and 2.5G standards both specify lower bandwidth systems that can be combined. The 3G standard specifies a larger bandwidth and much more dynamic range, and is generally implemented as a separate IC chip. When a wireless transceiver provides for all three standards, the transceiver may require separate hardware and/or pins for 2G/2.5G and 3G operations. Both the low-band (824-915 MHz) and the high-band (1710-1980 MHz) of the operating frequencies require their own 2G/2.5G output as well as 3G outputs (in all 4 pins) to drive a standard 50Ω load. In addition, any applicable sub-bands in the high-band may need additional outputs (e.g., two more pins).

Differential operation is optimal for circuit design and reduces the impact of offsets, etc. However, use of a single-ended output would waste half of the hardware and available current or require differential to single-ended conversion. Further, because transceivers generally drive a 50Ω load, the current consumption may be higher than desired. In particular, a transceiver chip is generally capable of providing a large output swing that cannot be directly utilized by a 50Ω load. A higher output impedance, and hence a higher swing, is desirable to reduce the current consumption of the transceiver. Thus, there remains a need for improved 2G/2.5G/3G transceiver designs.

SUMMARY

An exemplary multi-standard transceiver uses a common balun to reduce transceiver chip area and to provide impedance transformation. The exemplary multi-standard transceiver comprises a common balun, a controller, at least one first switch, and at least one second switch. The common balun comprises a primary and secondary coil. The controller controls the transceiver according to a first communication standard or a second communication standard. The at least one first switch connects the primary coil of the balun to a first signal path associated with the first communication standard or a second signal path associated with the second communication standard, responsive to a control signal provided by the controller. The at least one second switch connects the secondary coil of the balun to a first amplification path associated with the first communication standard or a second amplification path associated with the second communication standard, responsive to a control signal provided by the controller. In one embodiment, the second switch connects a first end of the secondary coil to the first or second amplification paths and connects the second end of the secondary coil to ground.

In one exemplary embodiment, the multi-standard transceiver further includes a common mixer. When the multi-standard transceiver operates according to the first communication standard, the common mixer is configured to output upconverted signals associated with the first communication standard to the first signal path responsive to a control signal output by the controller. When the multi-standard transceiver operates according to the second communication standard, the common mixer is configured to output upconverted signals associated with the second communication standard to the second signal path responsive to a control signal output by the controller. An RF buffer may also be used to connect the common mixer to the primary coil of the balun along one of the first signal path or second signal path.

A corresponding method of operating a multi-standard transceiver to use either a first communication standard or a different second communication standard is also disclosed. According to the method, upconverted signals associated with a selected communication standard are output via a common mixer. One or more first switches are controlled to connect a primary coil of a common balun to either a first signal path corresponding to a first communication standard, or to a second signal path corresponding to a second communication standard. One or more second switches are controlled to connect a secondary coil of the common balun to either a first amplification path associated with the first communication standard, or to a second amplification path associated with the second communication standard.

Of course, the present invention is not limited to the above features and advantages. Indeed, those skilled in the art will recognize additional features and advantages upon reading the following detailed description, and upon viewing the accompanying drawings

DETAILED DESCRIPTION

The invention described herein provides a 2G/2.5G and 3G transceiver that uses a common balun, and also uses a common RF mixer for both 2G/2.5G and 3G operations to overcome the problems associated with prior art solutions. While the invention described herein is presented in terms of the 2G/2.5G and 3G communication standards, it will be appreciated that the invention is applicable to any multi-standard transceiver. Before the present invention is described further herein, the following first describes a conventional solution and the problems associated therewith.

Figure 1:
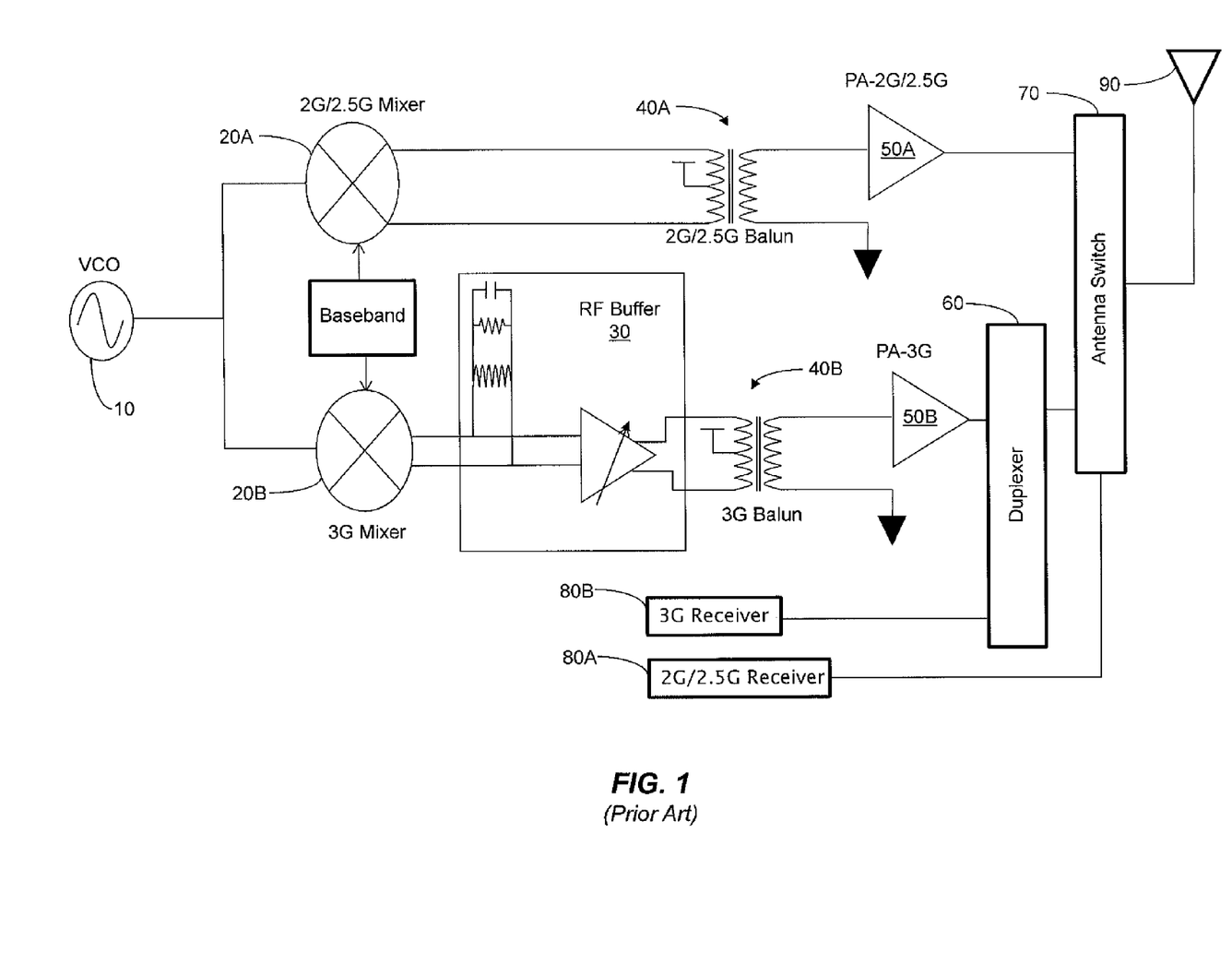
FIG. 1 depicts a conventional 2G/2.5G and 3G transceiver.

FIG. 1 shows a conventional transmitter circuit that uses multiple baluns 40A and 40B and multiple mixers 20A and 20B to provide differential-to-single ended conversion while still providing general direct-up transmit pathways (single band). The baluns 40A, 40B convert differential outputs to single-ended outputs, as well as provide impedance transformation to optimize current consumption. A Voltage Controlled Oscillator (VCO) 10, which may be implemented as a Phase-Locked Loop (PLL) for example, generates the channel frequency of interest $f_{vco}$. The 2G/2.5G mixer 20A or the 3G mixer 20B up-converts a baseband signal to RF (with I & Q mixing) using $f_{vco}$. Because 3G requires a larger dynamic range, e.g., ~80 dB, an RF buffer 30 is included in the 3G path after the 3G mixer 20B to increase the dynamic range without impacting the Local Oscillator (LO) leakage due to matching constraints. The 3G balun 40B follows the RF buffer 30 to provide differential-to-single-ended conversion and impedance transformation. The 3G balun 40B is followed by a 3G power amplifier (PA) 50B and duplexer 60. The duplexer 60 provides isolation between the 3G transmitter and the 3G receiver 80B at the antenna 90. For 2G/2.5 G operations, the mixer 20A has enough dynamic range to meet specifications. Thus, the output of the 2G/2.5G mixer 20A directly drives the 2G/2.5G balun 40A without using an RF buffer. The 2G/2.5G balun 40A provides the required differential to single-ended conversion and impedance transformation. The 2G/2.5G balun 40A is followed by a 2G/2.5G PA 50A and antenna switch 70, which isolates the 2G/2.5G transmitter from the 2G/2.5G receiver 80A.

While the transceiver of FIG. 1 provides a single-ended solution that maintains the benefits of a differential implementation, the baluns 40A, 40B and mixers 20A, 20B required to implement this solution take up an undesirably large amount of chip area.

Figure 2:
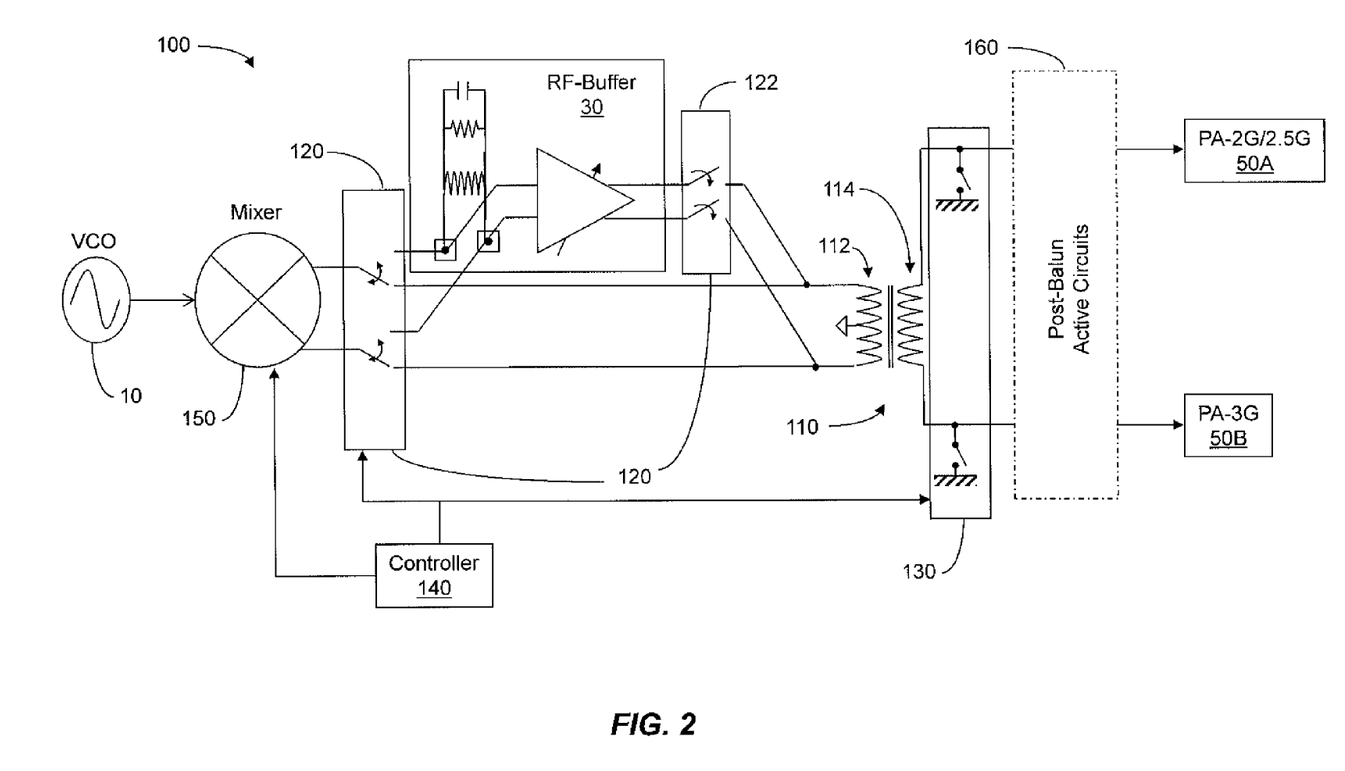
FIG. 2 depicts an exemplary 2G/2.5G and 3G transceiver according to one embodiment of the present invention.

FIG. 2 shows one exemplary transceiver 100 that uses a common balun 110 and a common mixer 150 for both 2G/2.5G and 3G signals to reduce the number of baluns required. In this embodiment, switches 120, 122, 130 selectively connect the primary coil of the balun 110 to either the 2G/2.5G path or the 3G path. More particularly, first switches 120, 122 act in concert to connect either the 2G/2.5G or 3G differential paths between the first and second ends of the primary coil 112 of the balun 110. In so doing, the first switches 120, 122 divert the current from the common mixer 150 to drive the balun 110 (2G/2.5G), or to drive an internal node at the input of the RF buffer 30 (3G). Second switches 130 connect one end of the secondary coil 114 of the balun 110 to either the 2G/2.5G PA 50A or 3G PA 50B, and connect the other end of the secondary coil 114 to AC ground. It will be appreciated that switches 120, 122, 130 may be implemented using any known switch technology, including but not limited to transistor switch technology. Controller 140 outputs a control signal configured to control the switches 120, 122, 130 depending on the communication standard currently driving the transceiver operations.

Figure 3A:
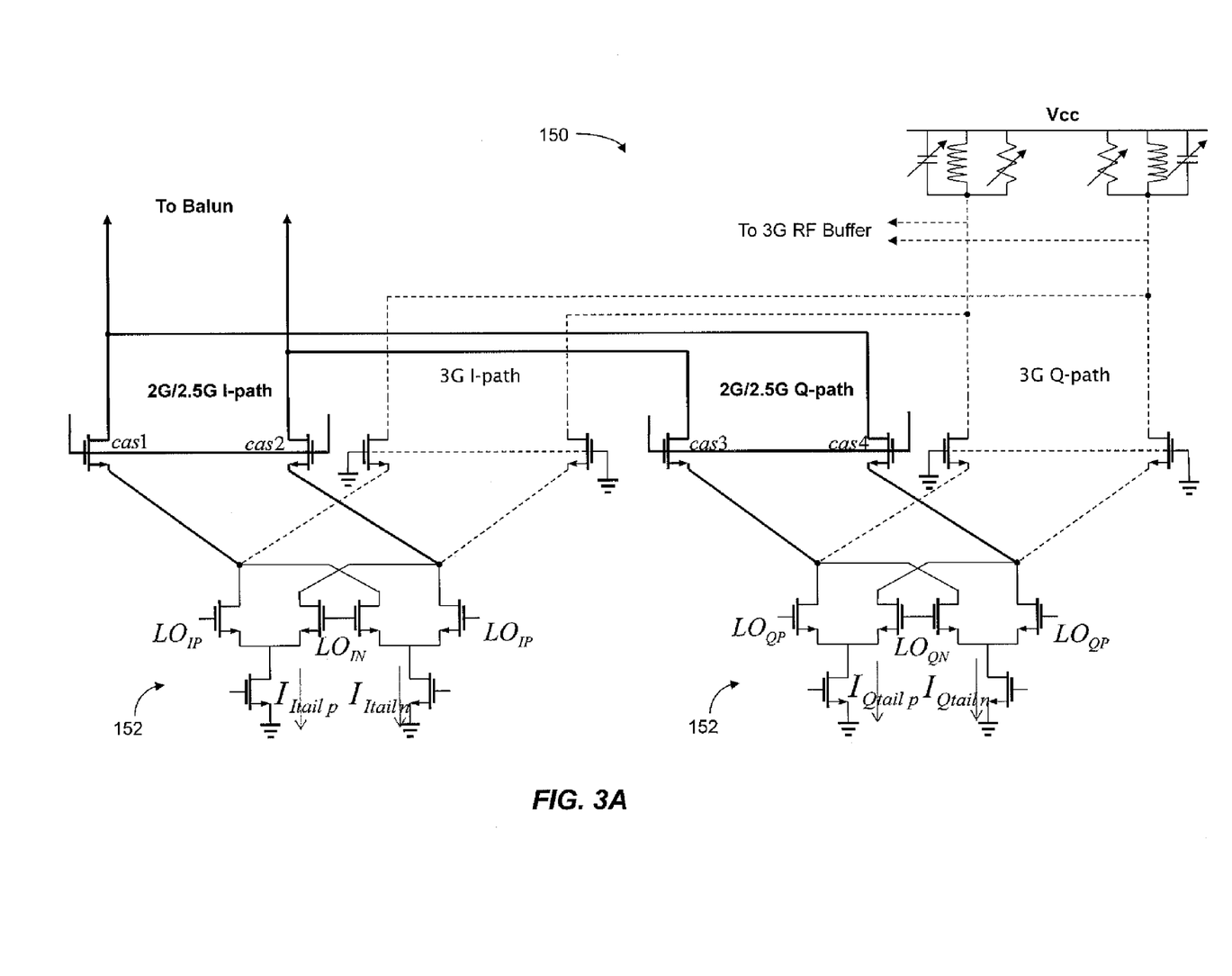
FIGS. 3A and 3B depict an exemplary embodiment of the multi-mode common mixer of FIG. 2.
Figure 3B:
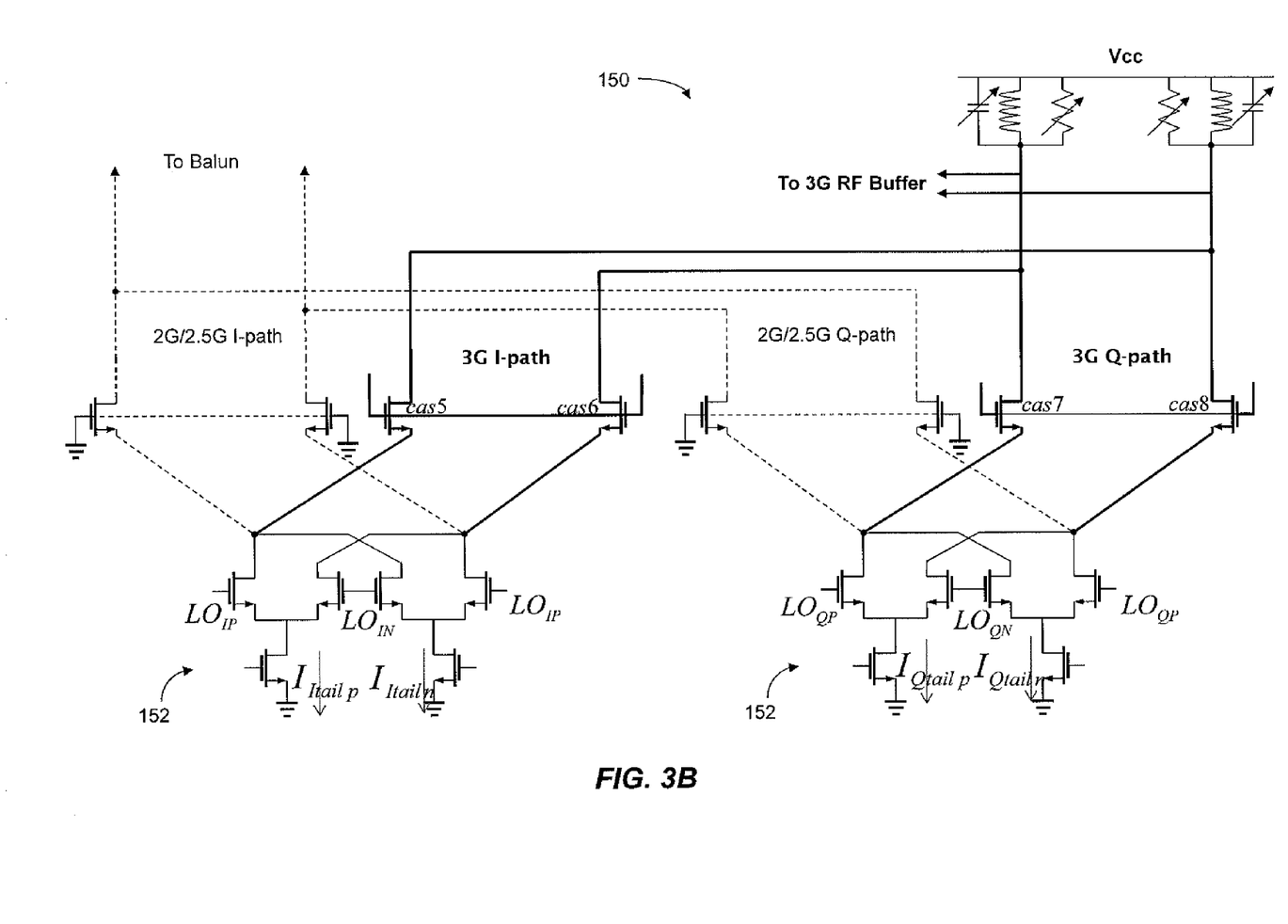

The embodiment of FIG. 2 uses the common mixer 150 for both the 2G/2.5G and 3G paths to further minimize hardware. The common mixer 150 can be used in multiple modes. FIG. 3A shows an example embodiment of mixer 150 operating in a 2G/2.5 G mode (active circuit portions of the mixer 150 are depicted with bold, non-dashed lines). Conversely, FIG. 3B shows the example mixer 150 operating in a 3G mode. The mixer 150 upconverts baseband signals, e.g., $I_{Itail}$, to RF signals. The mixer shown in FIG. 3A includes two classical Gilbert cell mixers 152 implemented with transistor switch technology. Cascode devices cas1, cas2, cas3, cas4, cas5, cas6, cas7 and cas8 are used to control an output path of the mixer 150. The cascode may comprise the switches 120 of FIG. 1, and may correspond to MOSFETs, for example. In FIG. 3A, the 2G/2.5G path switches are turned on (i.e., cas1, cas2, cas3, cas4 are ON). Hence the RF current at the output of the mixer 150 is diverted to the balun 110. When the same mixer 150 is operated in the 3G mode (FIG. 3B), the 3G path transistor switches turn on (i.e., cas5, cas6, cas7, cas8 are ON), diverting the mixer RF current to 3G RF Buffer 30.

The illustrated Gilbert cell mixer currents are represented by equations 1-4 below.

$$I_{Itail\,p} = I_{dc} + i_{is}(t) \qquad \text{equation (1)}$$

$$I_{Itail\,n} = I_{dc} - i_{is}(t) \qquad \text{equation (2)}$$

$$I_{Qtail\,p} = I_{dc} + i_{qs}(t) \qquad \text{equation (3)}$$

$$I_{Qtail\,n} = I_{dc} - i_{qs}(t) \qquad \text{equation (4)}$$

As shown in FIG. 2, active circuits 160 may optionally connect the secondary coil 114 of the common balun 110 to the power amplifiers 50A, 50B. The active circuits 160 serve to improve the impedance transformation of the transceiver 100, improve the AC ground connection to better isolate the 2G/2.5G and 3G paths, and/or provide specialized electrostatic discharge (ESD) protection for the multi-standard transceiver 100.

Figure 4:
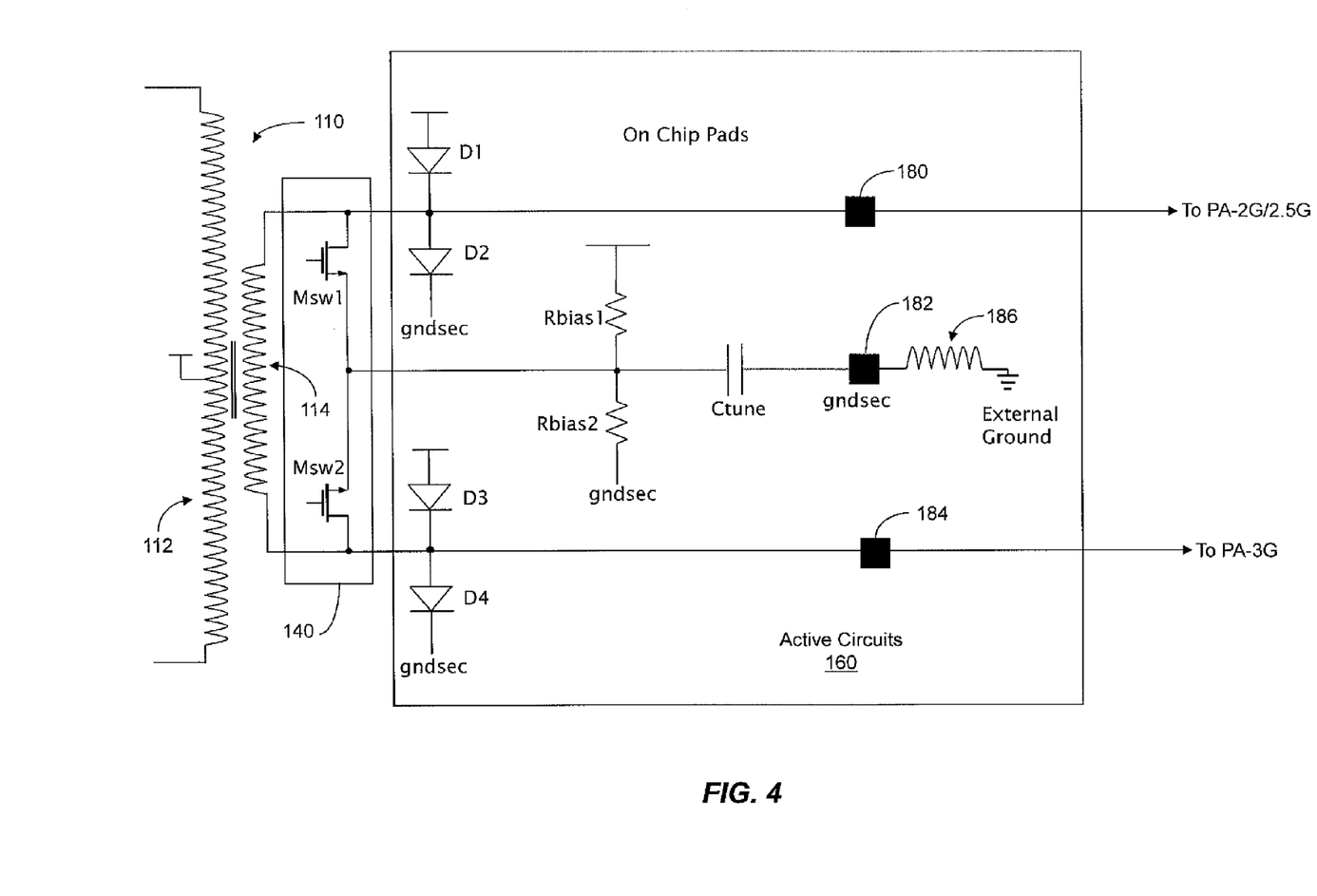
FIG. 4 depicts exemplary secondary circuitry between the balun and antenna of FIG. 2.

FIG. 4 shows one exemplary active circuit 160 including bias resistors Rbias1, Rbias2, a tuning capacitor Ctune, diodes D1-D4, and chip output pads 180, 182, 184. Resistors Rbias1, Rbias2 set the bias of the output pads 180, 182, 184. The bias voltage may be set to mid-rail to give the most range to the circuits at the output pads 180, 182, 184 to operate (e.g. by preventing parasitic diodes of the switches Msw1, Msw2 from turning on). Without such biasing, the DC voltage of the output pads 180, 182, 184 would be at ground, which could cause the switches Msw1, Msw2 to have difficulty staying off with a signal swing of the transceiver 100, and could also cause issues with triggering ESD. However, the biasing provided by resistors Rbias1, Rbias2 (e.g. to set a max swing of Vdd/2) prevents these issues.

Ctune is a decoupling capacitor that is fine tuned to resonate out with the inductance of bond wire 186 to provide as small a ground return path as possible via chip output pad 182, which improves isolation by ensuring that the load impedance of PA-3G 50B does not affect the power delivered to PA-2G/2.5G 50A, and vice versa. Diodes D1, D2, D3, and D4 provide ESD protection at the balun 110. While FIG. 4 only shows ESD protection diodes directly connected to the ends of the secondary coil 114 of the balun 110, it will be appreciated that additional ESD protection may be provided to the gndsec line, e.g., between switches Msw1, Msw2 and the Ctune.

Embodiments of the invention disclosed herein reduce the number of baluns in a multi-standard transceiver, e.g., a 2G/25.G and 3G transceiver. In so doing, the transceiver disclosed herein uses significantly less chip area without sacrificing signal swing by appropriate biasing. Additional chip area savings are also achieved by using the common mixer 150 for multiple modes. This is achieved while providing for a large difference in dynamic ranges between the different standards (e.g., 2G/2.5G, 3G).

Figure 5:
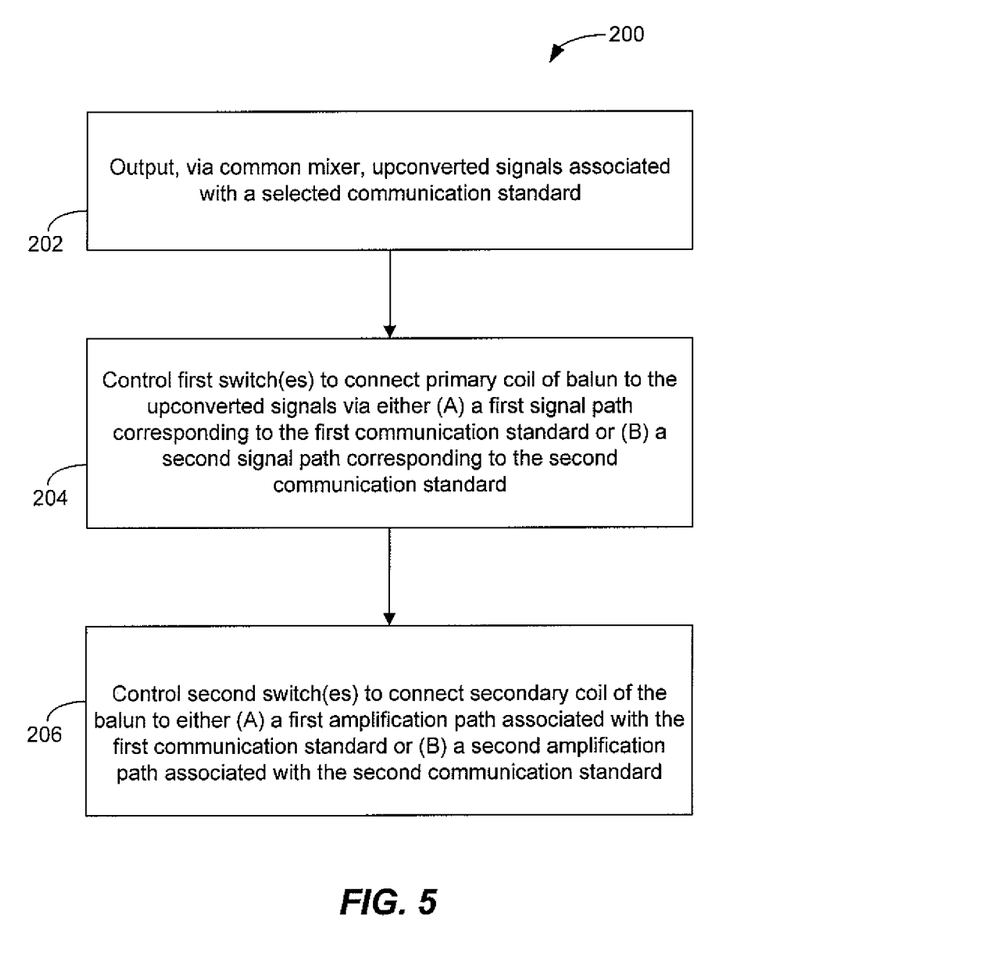
FIG. 5 schematically illustrates a method of operating a multi-standard transceiver to use either a first communication standard or a different second communication standard.

FIG. 5 schematically illustrates a method 200 of operating a multi-standard transceiver to use either a first communication standard or a different second communication standard using, for example, the transceiver 100 of FIG. 2. According to the method 200, upconverted signals associated with a selected communication standard are output via common mixer 150 (step 202). One or more first switches 120, 122 are controlled to connect a primary coil 112 of common balun 110 to either a first signal path corresponding to a first communication standard (e.g., the 2G/2.5G path), or to a second signal path corresponding to a second communication standard (e.g., the 3G path) (step 204). One or more second switches are controlled to connect the secondary coil 114 of the common balun 110 to either a first amplification path associated with the first communication standard (e.g., via output pad 180), or to a second amplification path associated with the second communication standard (e.g., via output pad 184) (step 206).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A multi-standard transceiver operative to transmit signals using either a first communication standard or a different second communication standard, the transceiver comprising:
   a balun comprising a primary coil and a secondary coil;
   a controller configured to control which communication standard is used by the multi-standard transceiver for signal transmissions;
   at least one first switch operative to connect the primary coil of the balun to a first signal path associated with the first communication standard or a second signal path associated with the second communication standard responsive to a control signal provided by the controller;
   at least one second switch operative to connect the secondary coil of the balun to a first amplification path associated with the first communication standard or a second amplification path associated with the second communication standard responsive to a control signal provided by the controller; and
   a mixer configured to:
      output upconverted signals associated with the first communication standard to the first signal path responsive to a control signal output by the controller when the multi-standard transceiver operates according to the first communication standard; and
      output upconverted signals associated with the second communication standard to the second signal path responsive to a control signal output by the controller when the multi-standard transceiver operates according to the second communication standard.

2. The multi-standard transceiver of claim 1, wherein the first and second communication standards are wireless communication standards, and wherein the multi-standard transceiver further comprises a radio frequency (RF) buffer connecting the common mixer to the primary coil of the balun along one of the first signal path or the second signal path.

3. The multi-standard transceiver of claim 1, wherein the common mixer comprises at least one Gilbert cell mixer.

4. The multi-standard transceiver of claim 1, wherein the at least one second switch includes a first output switch and a second output switch, the multi-standard transceiver further comprising a post-balun output circuit that includes:
   a first line coupling a first end of the secondary coil of the balun to the first amplification path via a first output pad;
   a second line coupling an opposite second end of the secondary coil of the balun to the second amplification path via a second output pad; and
   a third line operative to selectively couple outputs of the first and second output switches to ground via a third output pad responsive to a state of the first and second output switches.

5. The multi-standard transceiver of claim 4, further comprising a plurality of biasing resistors connected to the third line, the biasing resistors being configured to bias a DC voltage of the first, second and third output pads away from ground.

6. The multi-standard transceiver of claim 4, further comprising a decoupling capacitor connected to the third line between the outputs of the first and second output switches and the third output pad to reduce a resonance of an output bond wire connected to the third output pad.

7. A method of operating a transceiver to use either a first communication standard or a different second communication standard, the transceiver comprising a common mixer and a common balun that are utilized in signal processing operations for both of the communication standards, the method comprising:
   outputting, via the common mixer, upconverted signals associated with a selected one of the communication standards;
   controlling at least one first switch to selectively connect a primary coil of the balun to the upconverted signals via either a first signal path corresponding to the first communication standard, or a second signal path corresponding to the second communication standard, responsive to the communication standard selection; and
   controlling at least one second switch to connect a secondary coil of the balun to either a first amplification path associated with the first communication standard or a second amplification path associated with the second communication standard, responsive to the communication standard selection.

8. The method of claim 7, wherein the first and second communication standards are wireless communication standards, and wherein the multi-standard transceiver further comprises a radio frequency (RF) buffer connecting the common mixer to the primary coil of the balun along one of the first signal path or the second signal path.

9. The method of claim 7, wherein the common mixer comprises at least one Gilbert cell mixer.

10. The method of claim 7, wherein the at least one second switch includes a first output switch and a second output switch, and the multi-standard transceiver further comprises a post-balun output circuit that includes a first line coupling a first end of the secondary coil of the balun to the first amplification path via a first output pad, a second line coupling an opposite second end of the secondary coil of the balun to the second amplification path via a second output pad, and a third line operative to selectively couple outputs of the first and second output switches to ground via a third output pad, the method further comprising:
   biasing a DC voltage of the first, second and third output pads away from ground via a plurality of biasing resistors connected to the third line.

11. The method of claim 10, further comprising:
   reducing a resonance of an output bond wire connected to the third output pad via a decoupling capacitor connected to the third line between the outputs of the first and second output switches and the third output pad.

* * * * *